United States Patent
Qin

(10) Patent No.: US 10,379,394 B2
(45) Date of Patent: Aug. 13, 2019

(54) LIQUID CRYSTAL DISPLAY DEVICE AND METHOD OF FABRICATING THE SAME

(71) Applicant: BOE TECHNOLOGY GROUP CO., LTD., Beijing (CN)

(72) Inventor: Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 447 days.

(21) Appl. No.: 13/947,528

(22) Filed: Jul. 22, 2013

(65) Prior Publication Data

US 2014/0078434 A1  Mar. 20, 2014

(30) Foreign Application Priority Data

Sep. 19, 2012 (CN) .......................... 2012 1 0351045

(51) Int. Cl.
*G02F 1/1335* (2006.01)

(52) U.S. Cl.
CPC ............... *G02F 1/133512* (2013.01); *G02F 2001/133562* (2013.01); *G02F 2201/40* (2013.01)

(58) Field of Classification Search
CPC ............................................. G02F 1/133512
See application file for complete search history.

(56) References Cited

U.S. PATENT DOCUMENTS

| | | | |
|---|---|---|---|
| 6,271,901 B1 | 8/2001 | Ide et al. | |
| 6,660,653 B1 * | 12/2003 | Tzu | ........................ G03F 1/30 430/5 |
| 9,041,881 B2 * | 5/2015 | Takemoto | ............... G02B 3/005 349/96 |
| 2005/0152038 A1 | 7/2005 | Nishida et al. | |
| 2005/0243247 A1 * | 11/2005 | Ryu | .................. G02F 1/133512 349/106 |

(Continued)

FOREIGN PATENT DOCUMENTS

| CN | 1231035 A | 10/1999 |
|---|---|---|
| CN | 101002134 A | 7/2007 |

(Continued)

OTHER PUBLICATIONS

English machine translation of JP 2005/181744 A.*

(Continued)

*Primary Examiner* — Edward J Glick
*Assistant Examiner* — Mark D Teets
(74) *Attorney, Agent, or Firm* — Ladas & Parry LLP

(57) ABSTRACT

Embodiments of the present invention provide a liquid crystal display device and a fabricating method thereof, the display device comprising: a liquid crystal cell, including a color filter substrate and an array substrate provided opposite to each other and liquid crystal material provided between the two substrates; a lower polarizer, provided on a lower surface of the liquid crystal cell, i.e. a light incident side; an upper polarizer, provided on an upper surface of the liquid crystal cell, i.e. a light exiting side; and a light shielding pattern layer, including light shielding lines and being provided above the upper polarizer, i.e., at a light exiting side of the upper polarizer, wherein the color filter substrate is formed with a black matrix and a color filter thereon, and the array substrate is formed with gate lines, data lines, and thin film transistors thereon.

18 Claims, 1 Drawing Sheet

(56) References Cited

U.S. PATENT DOCUMENTS

| | | | |
|---|---|---|---|
| 2008/0007677 A1* | 1/2008 | Enomoto | G02F 1/133504 349/106 |
| 2008/0079866 A1 | 4/2008 | Mirnura et al. | |
| 2010/0135041 A1 | 6/2010 | Niu | |
| 2010/0315382 A1 | 12/2010 | Kurihara et al. | |
| 2012/0050660 A1* | 3/2012 | Park | G02F 1/133512 349/139 |
| 2012/0019740 A1 | 6/2012 | Kadowaki et al. | |
| 2012/0162055 A1* | 6/2012 | Hara | G02F 1/1362 345/92 |
| 2013/0063687 A1* | 3/2013 | Jang | G02B 5/201 349/106 |
| 2017/0199601 A1* | 7/2017 | Xu | G06F 3/041 |

FOREIGN PATENT DOCUMENTS

| | | |
|---|---|---|
| CN | 101231462 A | 7/2008 |
| CN | 101750668 A | 6/2010 |
| CN | 101939693 A | 1/2011 |
| CN | 102356348 A | 2/2012 |
| JP | 63-095489 A | 4/1988 |
| JP | 09-179107 A | 7/1997 |
| JP | 2001-034183 A | 2/2001 |
| JP | 2005-181744 A | 7/2005 |
| JP | 2005181744 A | 7/2005 |
| JP | 2006-309166 A | 11/2006 |
| JP | 2007-171539 A | 7/2007 |
| JP | 2008-089728 A | 4/2008 |
| JP | 2010-032907 A | 2/2010 |
| JP | 2010-085645 A | 4/2010 |
| JP | 2011-158574 A | 8/2011 |
| JP | 2012-042645 A | 3/2012 |
| KR | 20040104598 A | 12/2004 |
| WO | 2005/124441 A1 | 12/2005 |
| WO | 2008/023484 A1 | 2/2008 |
| WO | 2008023484 A1 | 2/2008 |
| WO | 2010/110432 A1 | 9/2010 |

OTHER PUBLICATIONS

English language machine translation of JP 2005181744, Shinichi.*
Extended European Search Report dated Jan. 14, 2014 Appln. No. EP 13 17 5048.
Korea Examination Opinion dated Dec. 8, 2014; Appln. No. 10-2013-0088138.
Second Chinese Office Action Appln. No. 201210351045.4; dated Feb. 9, 2015.
First Chinese Office Action dated Jul. 9, 2014; Appln. No. 201210351045.4.
Korean Office Action Appln. No. 10-2013-0088138; dated Jun. 24, 2015.
Third Chinese Office Action Appln. No. 201210351045.4; dated Jul. 15, 2015.
Korea Examination Opinion dated Jun. 23, 2014; Appln. No. 10-2013-0088138.
EPO Office Action dated May 12, 2015; Appln. No. 13 175 048.1-1904.
Korean Office Action Appln. No. 10-2013-0088138; dated Oct. 26, 2015.
European Patent Office Office Action Appln. No. 13 175 048.1-1904; dated Feb. 5, 2016.
Japanese Office Action dated May 29, 2017; Appln. No. 2013-140499.

* cited by examiner

LIQUID CRYSTAL DISPLAY DEVICE AND METHOD OF FABRICATING THE SAME

TECHNICAL FIELD

Embodiments of the present invention relate to a liquid crystal display device and a method of fabricating the same.

BACKGROUND

One of the primary reasons for a bad viewing angle of a liquid crystal display device lies in that light is seriously leaked from the liquid crystal display device in a non-axis direction in a dark state. At present, there are two methods of achieving a wide viewing angle liquid crystal display device: one is to make compensation for light leakage in a dark state utilizing an anisotropic compensation film additionally provided on an upper surface of the liquid crystal display device; the other is to drive liquid crystal by adopting a in-plane electric field technique, such as a FFS (Fringe Field Switching)-type display device and an IPS (In Plane Switch)-type display device, however, to achieve a super wide viewing angle, it is still necessary to additionally provide a compensation film on the upper surface of the liquid crystal display device.

Nevertheless, the compensation effect utilizing the compensation film to achieve a wide viewing angle is limited, e.g. the effect of compensation for light leakage in a dark state is not ideal, etc.

SUMMARY

Embodiments of the present invention provides a liquid crystal display device and a method of fabricating the same, for reducing leakage of light from a liquid crystal display device in a non-axis direction in a dark state.

In a first respect, an embodiment of the present invention provides a liquid crystal display device, comprising: a liquid crystal cell, including a color filter substrate and an array substrate provided opposite to each other and liquid crystal material provided between the color filter substrate and the array substrate; a lower polarizer, provided on a lower surface of the liquid crystal cell, i.e. a light incident side of the liquid crystal cell; an upper polarizer, provided on an upper surface of the liquid crystal cell, i.e. a light exiting side of the liquid crystal cell; and a light shielding pattern layer, including light shielding lines and being provided above the upper polarizer, i.e., at a light exiting side of the upper polarizer, wherein the color filter substrate is formed with a black matrix and a color filter thereon, and the array substrate is formed with gate lines, data lines, and thin film transistors thereon.

Alternatively, positions of the light shielding lines correspond to opaque regions in pixel regions of the liquid crystal cell.

Alternatively, the liquid crystal display device further comprises a scattering film provided above the light shielding pattern layer, i.e., at a light exiting side of the light shielding pattern layer.

Alternatively, the liquid crystal display device further comprises a transparent layer, wherein the transparent layer covers the light shielding lines and regions between the light shielding lines; or the transparent layer is merely filled in the regions between the light shielding lines.

Alternatively, the transparent layer has a scattering function.

Alternatively, the transparent layer is doped with scattering particles.

Alternatively, on the upper surface of the transparent layer, there is formed a concave convex structure.

In a second respect, another embodiment of the present invention provides a fabricating method of the liquid crystal display device mentioned above, comprising: fabricating a liquid crystal cell; attaching an upper polarizer and a lower polarizer onto an upper surface and a lower surface of the liquid crystal cell, respectively; fabricating a light shielding film on the upper polarizer of the liquid crystal display device; and forming a light shielding pattern layer including light shielding lines with a patterning process.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical solutions and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Firstly, it is to be understood that in all embodiments of the present invention, "upper" and "lower" are defined according to the traveling direction of light from a backlight: "lower" is where the light from the backlight passes through first, and "upper" is where the light from the backlight passes through later. For example, in the aforementioned liquid crystal display device, the light from the backlight passes through a lower polarizer first and then passes through an upper polarizer. Exemplarily, a liquid crystal display device comprises a color filter substrate and an array substrate which are cell-assembled, and a liquid crystal layer provided between the two substrates. In this case, an upper polarizer refers to the polarizer attached to an upper surface of the color filter substrate, i.e. the surface of the color filter substrate not facing the array substrate; and an lower polarizer refers to the polarizer attached to the lower surface of the array substrate, i.e. the surface of the array substrate not facing the color filter substrate.

One of the primary reasons for a bad viewing angle of a liquid crystal display device lies in that light is seriously leaked from the liquid crystal display device in a non-axis direction in a dark state. To explain the non-axis direction, an axis direction needs to be introduced at first. The axis direction means a normal direction of a display panel, and correspondingly, the so-called non-axis direction means a non-normal direction.

When a liquid crystal display device is viewed along a non-axis direction in a dark state, the light leakage is mainly caused by the following: if the polarizing directions of the upper and lower polarizers of the liquid crystal display device are perpendicular to each other, when viewed along a non-axis direction, the polarizing directions of the upper and lower polarizers are no longer perpendicular and the direction of an optical axis of the liquid crystal may be deflected to some degree, such that the light entering from the lower polarizer changes in its polarizing state after passing through the liquid crystal cell, and can not be completely absorbed by the upper polarizer, thereby resulting in the light leakage.

Figure 1:
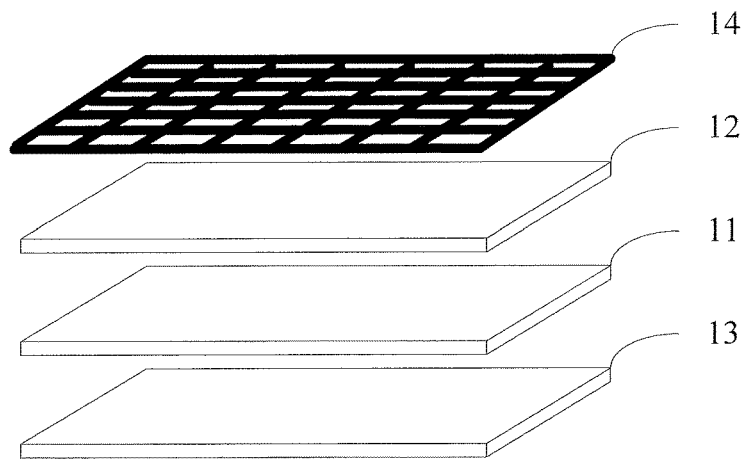
FIG. 1 is a schematic view illustrating a structure of a liquid crystal display device according to an embodiment of the present invention.

To reduce the light leakage from the liquid crystal display device in the non-axis direction in a dark state, as shown in FIG. 1, an embodiment of the present invention provides a liquid crystal display device, the liquid crystal display device comprising: a liquid crystal cell 11; a lower polarizer 13, provided on a lower surface, i.e. a light incident side, of the liquid crystal cell; and an upper polarizer 12, provided on an upper surface, i.e. a light exiting side, of the liquid crystal cell. Further, the liquid crystal display device comprises a light shielding pattern layer 14 provided above the upper polarizer, i.e. a light exiting side of the upper polarizer, wherein the light shielding pattern layer 14 comprises light shielding lines, which may be in any shapes.

It is to be understood that the liquid crystal cell according to an embodiment of the present invention may comprise a color filter substrate formed with a black matrix and a color filter thereon, an array substrate disposed opposite to the color filter substrate and formed with a thin film transistor, a gate line, a data line and a pixel electrode thereon, and a liquid crystal material interposed between the color filter substrate and the array substrate. The specific structure of the liquid crystal cell in the embodiment of the present invention may be a conventional structure according to the type of the used liquid crystal display device. Detailed description is omitted for sake of brevity.

Alternatively, the material of the light shielding pattern layer may be the same as that of the black matrix, such as a black resin, and also may be any other opaque materials.

According to the liquid crystal display device provided by an embodiment of the present invention, a light shielding pattern layer is additionally provided on an upper surface, i.e. a light exiting side, of the liquid crystal display device, and the light emitting toward the light shielding lines along the non-axis direction is absorbed by the light shielding pattern layer, but the light in an axis direction may directly pass through, thereby reducing leakage of light from the liquid crystal display device in a non-axis direction in a dark state.

Alternatively, to absorb the leaked light in any non-axis direction as much as possible, the light shielding lines form a plurality of enclosed regions. The enclosed regions may be in any shapes, e.g. rectangle, circle, ellipse, hexagon, etc.

Figure 2:
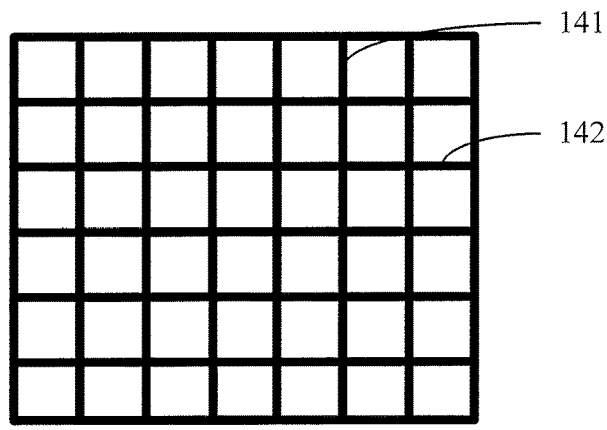
FIG. 2 is a schematic view illustrating a structure of a light shielding pattern layer according to an embodiment of the present invention.

Exemplarily, as shown in FIG. 2, the light shielding pattern layer 14 comprises a plurality of first light shielding lines 141 arranged in parallel and a plurality of second light shielding lines 142 arranged in parallel, the first light shielding lines and the second light shielding lines being in parallel with the gate lines and data lines in the liquid crystal display device, respectively. Generally speaking, the extending directions of the gate lines and the data lines in the liquid crystal display device are perpendicular to each other. In this case, the first light shielding lines 141 and second light shielding lines 142 that the light shielding pattern layer 14 comprises are perpendicular to each other, as shown in FIG. 2, thereby forming a plurality of rectangular enclosed regions.

Further, as for distribution of the light shielding lines, positions of the light shielding lines correspond to the opaque regions in the pixels of the liquid crystal display device. In particular, the light shielding lines may merely correspond to partial opaque regions in the pixel regions, and the light shielding lines may also correspond to all the opaque regions in the pixel regions of course.

Exemplarily, the opaque regions corresponding to the light shielding lines in the pixel regions may be the regions where the gate lines and the data lines are located. The light shielding lines are in the following positional relationship with the gate lines and the data lines: as shown in FIG. 2, positions of the first light shielding lines 141 and the second light shielding lines 142 of the light shielding pattern layer directly correspond to positions of the gate lines and the data lines in the liquid crystal display device, respectively. It is to be understood that "directly correspond" herein means that from a top view, each of the first light shielding lines is in a region where one gate line (or one data line) is provided, and each of the second light shielding lines is in a region where one date line (or one gate line) is provided. In this case, the light shielding lines may absorb the light travelling along the non-axis direction in the liquid crystal display device, without occupying the light transmitting regions in the pixel regions of the liquid crystal display device.

Further, as shown in FIG. 2, positions of the first light shielding lines and second light shielding lines of the light shielding pattern layer respectively correspond to those of the gate lines and the data lines in the liquid crystal display device in a one-to-one manner. It is to be understood that based on the positional relationship between the light shielding lines and the gate lines and the data lines, "correspond to . . . in a one-to-one manner" herein means as follow: the number of the first light shielding lines is equal to the number of the gate lines (or the data lines), and from a top view, the number of the second light shielding lines is equal to the number of the data lines (or the gate lines); each of the first light shielding lines is provided in the region where its corresponding gate line (or data line) is located and each of the second light shielding lines is provided in the region where its corresponding data line (or gate line) is located.

Exemplarily, the opaque regions in the pixel regions corresponding to the light shielding lines are regions provided with a black matrix, and all the light shielding lines of the light shielding pattern layer correspond to the regions with a black matrix. The light shielding lines may correspond to partial black matrix regions, and may also correspond to all the black matrix regions. When the light shielding lines correspond to all the black matrix regions, patterns of the light shielding pattern layer are consistent with the black matrix patterns provided on the color filter substrate of the liquid crystal display device. In this case, when the light shielding pattern layer is fabricated, mask which have been used to fabricate the black matrix patterns may be adopted, thereby reducing the number of the mask used in the fabricating process of the display device.

Figure 3:
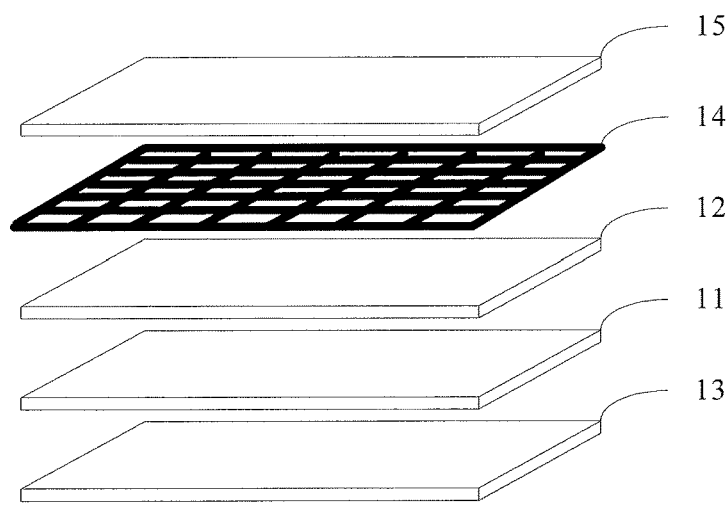
FIG. 3 is a schematic view illustrating a structure of another liquid crystal display device according to an embodiment of the present invention.

For further increasing a viewing angle of the liquid crystal display device, as shown in FIG. 3, based on the above liquid crystal display device formed with the light shielding pattern layer 14, the liquid crystal display device further comprises a scattering film 15 provided above the light shielding pattern layer 14.

Alternatively, the scattering film may be directly attached onto the light shielding pattern layer 14. At this time, the regions between the light shielding lines may not be filled with anything (vacuum) or may be filled with air.

Further, in an embodiment of the present invention, to stabilize and protect the structure of the light shielding pattern layer, the liquid crystal display device further comprises a transparent layer (not shown in the drawings); the transparent layer covering the light shielding lines and the region between the light shielding lines. In other words, the transparent layer covers the light shielding lines while it fills the region between the light shielding lines; or the transparent layer is merely filled in the region between the light shielding lines, wherein the region between the light shielding lines means the regions in which no light shielding lines are formed.

Exemplarily, the transparent layer covers the light shielding lines and the regions between the light shielding lines as shown in FIG. 2, i.e. the transparent layer is not only filled in the regions surrounded by the first light shielding lines and the second light shielding lines, but also covers the light shielding lines of the light shielding pattern layer. The transparent layer is merely filled in the regions between the light shielding lines, i.e. the transparent layer is merely filled in the regions surrounded by the first light shielding lines and the second light shielding lines At this time, the scattering film 15 may be provided on the upper surface of the liquid crystal display device formed with the transparent layer. Further, to facilitate attaching the scattering film, the surface of the liquid crystal display device formed with the transparent layer is a flat surface before the scattering film is attached. Exemplarily, as shown in FIG. 2, if the transparent layer covers the light shielding lines of the light shielding pattern layer and the regions surrounded by the first light shielding lines and the second light shielding lines, the surface of the transparent layer is a flat surface; if the transparent layer is merely filled in the regions surrounded by the first light shielding lines and the second light shielding lines, the thickness of the transparent layer is equal to that of the light shielding pattern layer, that is to say, the transparent material fills and levels up the regions surrounded by the first light shielding lines and the second light shielding lines.

It is to be understood that the material of the transparent layer may be a transparent resin, and may be any other transparent materials of course.

Based on the above liquid crystal display device formed with the light shielding pattern layer, the viewing angle of the liquid crystal display device may be further increased in other manners other than attachment of the scattering film. Alternatively, a transparent layer having a scattering function may be provided on the liquid crystal display device formed with the light shielding pattern layer. As such, the transparent layer having the scattering function may cover the light shielding lines and the regions between the light shielding lines; or it may merely fill the regions between the light shielding lines. In this way, a separate scattering film is omitted, the object of further increasing the viewing angle is achieved, and the fabricating process becomes simpler.

To allow the transparent layer to have the scattering function, the transparent layer having a scattering structure may be fabricated. Exemplarily, the transparent layer may have the scattering structure by a processing treatment. In particular, a transparent layer having a special exterior shape may be fabricated, e.g. an upper surface of the transparent layer may be fabricated to be a surface with a concave convex structure, which has a function of scattering light; a transparent layer having a special interior structure may be fabricated, e.g. the transparent layer may be doped with scattering particles. Of course, the above object may be reached as well by fabricating the transparent layer with a material which itself has a scattering function.

Another embodiment of the present invention provides a method of fabricating a liquid crystal display device, the method particularly comprising:

S401, fabricating a liquid crystal cell;

S402, attaching an upper polarizer and a lower polarizer onto an upper surface and a lower surface of the liquid crystal cell, respectively;

S403, fabricating a light shielding film on the upper polarizer of the liquid crystal display device, for example, by a film deposition process in particular. It is to be understood that the light shielding film may be fabricated by other techniques, not limited to the film deposition process.

S404, treating the light shielding film with a patterning process, such that a light shielding pattern layer comprising the light shielding lines is formed, wherein the light shielding lines may be in any shapes.

Exemplarily, step S404 may comprise the following steps in particular:

(1) coating a photoresist on a surface of the light shielding film;

(2) retaining the photoresist corresponding to the patterns of the light shielding pattern layer to be formed by means of exposure and development processes;

(3) etching a portion of the light shielding film not protected by the photoresist to remove the portion of the light shielding film not protected by photoresist, and forming the light shielding pattern layer;

(4) removing the remaining photoresist.

By the above steps, the light shielding pattern layer is fabricated on the upper polarizer of the liquid crystal display device, such that after the light of a backlight passes through the liquid crystal display device, the light travelling along the non-axis direction in the liquid crystal display device is absorbed by the light shielding pattern layer and the light leakage is reduced.

The above fabricating method may further comprise:

S405, on the liquid crystal display device formed with the light shielding pattern layer, filling a transparent material merely in regions between the light shielding lines to form a transparent layer, or covering the light shielding lines and the regions between the light shielding lines with the transparent material to form a transparent layer.

Alternatively, the surface of the liquid crystal display device formed with the transparent layer is a flat surface, such that it is convenient to attach a scattering film during performing step S406.

The above fabricating method may further comprise:

S406, providing a scattering film on the liquid crystal display device formed with the light shielding pattern layer.

In this case, because of the effect of the scattering film, after the light travelling along an axial direction in the liquid crystal display device is scattered by the scattering film, a range of the viewing angle will be increased.

It is to be understood that step S406 may be performed following step S405. Of course, the scattering film may be directly attached onto the light shielding pattern layer without performing step S405. At this time, the regions between the light shielding lines may not be filled with anything (vacuum), or may be filled with air.

Alternatively, step S405 further comprises:

S4051, doping the transparent layer with scattering particles. In particular, the scattering particles may be added when the transparent material is in a molten state, and then the transparent material doped with the scattering particles is filled in the regions between the light shielding lines or is coated on the surface of the light shielding pattern layer.

S4052, forming a concave convex structure on an upper surface of the transparent layer. In particular, after the transparent material in a molten state is filled in the light shielding pattern layer, before the transparent material is completely cured, the surface of the transparent layer formed after curing of the transparent material is made to have the concave convex structure through a processing treatment.

It is to be understood that steps S4051 and S4052 may be performed in a alternative manner. If one of the steps is selected, the step of attaching the scattering film, i.e. step S406, may be omitted. Accordingly, processes may be simplified and production efficiency may be improved.

The method of fabricating the liquid crystal display device provided by an embodiment of the present invention includes the steps of: fabricating a light shielding film on an upper surface of the liquid crystal display device, forming a light shielding pattern layer with a patterning process, and thus, the light shielding pattern layer can be utilized to absorb the light travelling along a non-axis direction, thereby reducing leakage of light from the liquid crystal display device in the non-axis direction in a dark state; further by providing a transparent layer and/or a scattering film on the liquid crystal display device formed with the light shielding pattern layer, the scattering effect on the light can be enhanced, thereby increasing a viewing angle of the liquid crystal display device.

The liquid crystal display device according to an embodiment of the present invention can be served as a display of any product or component having a display function, such as, a liquid crystal television, a digital camera, a mobile phone, a tablet PC, etc.

With the liquid crystal display device and the method of fabricating the same provided by the embodiments of the present invention, a light shielding film is fabricated on an upper surface of the liquid crystal display device; the light emitting toward the light shielding lines along a non-axis direction can be absorbed by the light shielding pattern layer, while the light emitting toward the light shielding lines along an axial direction can pass through directly, thereby reducing leakage of light from the liquid crystal display device in a non-axis direction in a dark state; the viewing angle of the display device may be further increased by utilizing the scattering effect of the transparent layer and/or the scattering film on light.

The above descriptions are merely modes of carrying out the present invention, but the scope of the present invention is not limited to them. Any alternations or substitutions that those skilled in the art shall readily envisage within the technical scope disclosed by the present invention should be covered within the scope of the present invention. Accordingly, the scope of the present invention should be subject to the scope of the appended claims.

The invention claimed is:

1. A liquid crystal display device, comprising:
a liquid crystal cell, including a color filter substrate and an array substrate provided opposite to each other and liquid crystal material provided between the color filter substrate and the array substrate;
a lower polarizer, provided on a light incident side of the liquid crystal cell;
an upper polarizer, provided on a light exiting side of the liquid crystal cell; and
a light shielding pattern layer, consisting of light shielding lines and being provided at a light exiting side of the upper polarizer,
wherein the color filter substrate is formed with a black matrix and a color filter thereon, and the array substrate is formed with gate lines, data lines, and thin film transistors thereon,
wherein positions of the light shielding lines directly correspond to regions of the liquid crystal display device formed with a black matrix therein,
wherein a pattern formed by the light shielding lines is identical to a pattern of the black matrix,
wherein the light shielding lines consist of a plurality of first light shielding lines and a plurality of second light shielding lines, and the plurality of first light shielding lines and the plurality of second light shielding lines are in parallel with the gate lines and the data lines, respectively,
wherein, from a top view, each of the plurality of first light shielding lines is only located within a region where a corresponding gate line is provided, and each of the plurality of second light shielding lines is only located within a region where a corresponding data line is provided, and
wherein the light shielding lines are configured to absorb light emitting toward the light shielding lines in a non-axis direction and allow light in an axis direction to pass through.

2. The liquid crystal display device according to claim 1, wherein the liquid crystal display device further comprises a scattering film provided at a light exiting side of the light shielding pattern layer.

3. The liquid crystal display device according to claim 1, wherein positions of the light shielding lines correspond to opaque regions in pixel regions of the liquid crystal cell.

4. The liquid crystal display device according to claim 3, wherein the positions of the light shielding lines correspond to regions where the gate lines and the data lines of the liquid crystal cell are located.

5. The liquid crystal display device according to claim 1, further comprising: a transparent layer, wherein the transparent layer covers the light shielding lines and regions between the light shielding lines; or the transparent layer is merely filled in the regions between the light shielding lines.

6. The liquid crystal display device according to claim 5, wherein the transparent layer has a scattering function.

7. The liquid crystal display device according to claim 6, wherein the transparent layer is doped with scattering particles.

8. The liquid crystal display device according to claim 6, wherein on the upper surface of the transparent layer, there is formed a concave convex structure.

9. The liquid crystal display device according to claim 1, wherein the light shielding lines of the light shielding pattern layer form enclosed regions.

10. The liquid crystal display device according to claim 9, wherein the enclosed regions is in a rectangular, circular, elliptical, or hexagonal shape.

11. A fabricating method of the liquid crystal display device according to claim 1, comprising:
fabricating a liquid crystal cell;
attaching an upper polarizer and a lower polarizer onto an upper surface and a lower surface of the liquid crystal cell, respectively;
fabricating a light shielding film on the upper polarizer of the liquid crystal display device; and forming a light shielding pattern layer including light shielding lines with a patterning process, wherein positions of the light shielding lines directly correspond to regions of the liquid crystal cell formed with a black matrix therein, wherein a pattern formed by the light shielding lines is identical to a pattern of the black matrix.

12. The fabricating method according to claim 11, wherein the forming the light shielding pattern layer by using the patterning process comprises:

coating a photoresist on a surface of the light shielding film;

retaining the photoresist corresponding to the light shielding lines of the light shielding pattern layer to be formed by means of exposure and development processes;

removing a portion of the light shielding film not protected by the photoresist to form the light shielding lines of the light shielding pattern layer; and removing the remaining photoresist.

13. The fabricating method according to claim 11, further comprising:

on the liquid crystal display device formed with the light shielding pattern layer, filling transparent material merely in regions between the light shielding lines to form a transparent layer, or covering the light shielding lines and the regions between the light shielding lines with the transparent material to form a transparent layer.

14. The fabricating method according to claim 11, further comprising:

providing a scattering film on the liquid crystal display device formed with the light shielding pattern layer.

15. The fabricating method according to claim 14, further comprising:

doping the transparent layer with scattering particles.

16. The fabricating method according to claim 14, further comprising:

forming a concave convex structure on an upper surface of the transparent layer.

17. The fabricating method according to claim 11, wherein positions of the light shielding lines correspond to opaque regions in pixel regions of the liquid crystal display device.

18. The liquid crystal display device according to claim 17, wherein the positions of the light shielding lines correspond to regions where gate lines and data lines of the liquid crystal cell are located.

* * * * *